(12) United States Patent
Land

(10) Patent No.: US 6,881,065 B1
(45) Date of Patent: Apr. 19, 2005

(54) PENMANSHIP AID

(76) Inventor: L. C. Land, 6212 Kashmere St., Houston, TX (US) 77026

( * ) Notice: Subject to any disclaimer, the term of this patent is extended or adjusted under 35 U.S.C. 154(b) by 0 days.

(21) Appl. No.: 10/839,020

(22) Filed: May 6, 2004

(51) Int. Cl.$^7$ .............................................. G09B 11/02
(52) U.S. Cl. .............................. 434/166; 401/6; 401/7; 401/8; 15/437
(58) Field of Search ............................. 434/166; 401/6, 401/7, 8; 15/437

(56) References Cited

U.S. PATENT DOCUMENTS

| | | | |
|---|---|---|---|
| 478,787 A | | 7/1892 | Croom |
| 485,440 A | * | 11/1892 | Thornhill ........................ 401/8 |
| 490,906 A | * | 1/1893 | Helenbolt ..................... 15/437 |
| 563,107 A | * | 6/1896 | Watt ........................... 434/166 |
| 617,169 A | * | 1/1899 | Lanier ......................... 434/166 |
| 940,744 A | * | 11/1909 | Smith .......................... 434/166 |
| 1,184,155 A | | 5/1916 | Williams |
| 2,497,418 A | | 2/1950 | Schroader |
| 2,498,105 A | * | 2/1950 | Dolan .......................... 401/48 |
| 2,697,416 A | * | 12/1954 | Simmons ..................... 401/48 |
| 3,503,546 A | * | 3/1970 | Hunt ........................... 224/218 |
| 3,972,628 A | | 8/1976 | Stevers |
| 4,602,885 A | | 7/1986 | Bischoff et al. |
| 4,917,517 A | | 4/1990 | Ertz |
| 4,957,442 A | | 9/1990 | Prater |
| D328,759 S | | 8/1992 | Pozil et al. |
| 5,791,705 A | * | 8/1998 | Romero et al. ............... 294/25 |

* cited by examiner

*Primary Examiner*—Derris H. Banks
*Assistant Examiner*—Dmitry Suhol

(57) ABSTRACT

A penmanship aid includes a base portion that has an upper surface, a lower surface, a first lateral side, a second lateral side, a front side and a back side. Each of a pair of supports is hingedly coupled to the base portion. The supports are each positioned adjacent to one of the front and back sides such that each of the supports generally extends upwardly from a respective one of the front and back sides. Each of a pair of biasing members is coupled to one of the supports such that the upper ends are biased toward each other. A ball bearing is rotatably mounted in the lower surface such that the ball bearing extends through a plane of the lower surface. An edge of a hand may be positioned adjacent to the upper surface such that each of the supports is abutting opposite sides of the hand.

10 Claims, 1 Drawing Sheet

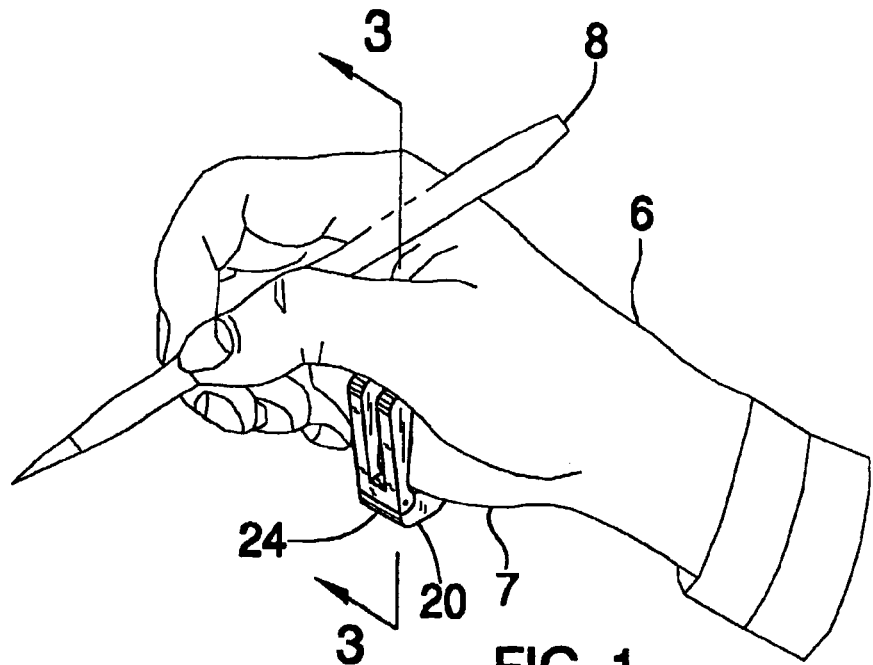
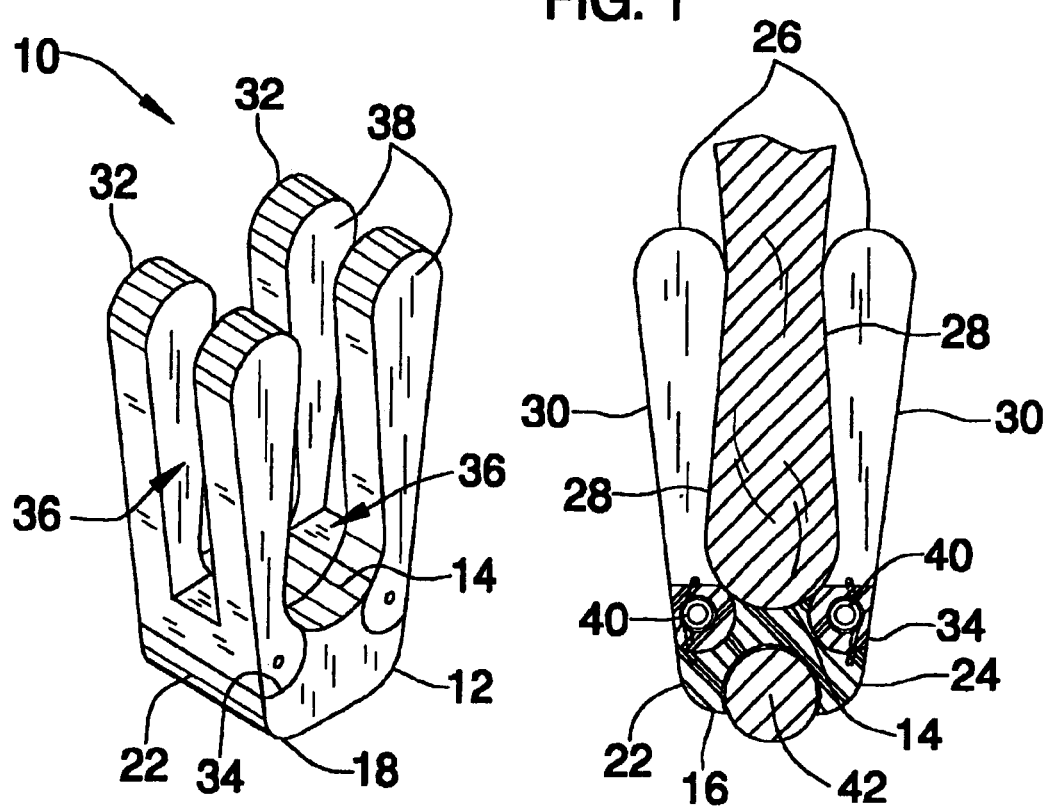

PENMANSHIP AID

BACKGROUND OF THE INVENTION

1. Field of the Invention

The present invention relates to writing support devices and more particularly pertains to a new writing support device for aiding a person in smoothly writing across a page.

2. Description of the Prior Art

The use of writing support devices is known in the prior art. U.S. Pat. No. 1,184,155 describes a device that supports a writing utensil within a hand to teach a person the correct manner of holding the writing utensil. Another type of writing support device is U.S. Pat. No. 3,972,628 having a bracket assembly that supports a writing utensil in an angled orientation with respect to a page to be written on. A user may move the bracket in order to write on the page. Another device that holds the pen in an angled orientation is U.S. Pat. No. 4,917,517. This device also utilizes a panel on which the user's hand fits. By moving their hand, the user may write with the utensil.

While these devices fulfill their respective, particular objectives and requirements, the need remains for a device that allows for smoother movement of a hand across a page or other parchment onto which a person desires to write. By allowing smooth movement of the hand, the user may write more clearly and with less pronounced jaggedness in the penmanship.

SUMMARY OF THE INVENTION

The present invention meets the needs presented above by generally comprising a base portion that has an upper surface, a lower surface, a first lateral side, a second lateral side, a front side and a back side. Each of a pair of supports is hingedly coupled to the base portion. The supports are each positioned adjacent to one of the front and back sides such that each of the supports generally extends upwardly from a respective one of the front and back sides. Each of a pair of biasing members is coupled to one of the supports such that the upper ends are biased toward each other. A ball bearing is rotatably mounted in the lower surface such that the ball bearing extends through a plane of the lower surface. An edge of a hand may be positioned adjacent to the upper surface such that each of the supports is abutting opposite sides of the hand.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective in-use view of a penmanship aid according to the present invention.

FIG. 2 is a perspective view of the present invention.

FIG. 3 is a cross-sectional view taken along line 3—3 of FIG. 1 of the present invention.

DESCRIPTION OF THE PREFERRED EMBODIMENT

With reference now to the drawings, and in particular to FIGS. 1 through 3 thereof, a new writing support device embodying the principles and concepts of the present invention and generally designated by the reference numeral 10 will be described.

As best illustrated in FIGS. 1 through 3, the penmanship aid 10 generally comprises a base portion 12 that has an upper surface 14, a lower surface 16, a first lateral side 18, a second lateral side 20, a front side 22 and a back side 24. The upper surface 14 is concavely arcuate from the front side 22 to the back side 24.

Each of a pair of supports 26 is hingedly coupled to the base portion 12. Each of the supports 24 is positioned adjacent to one of the front 22 and back 24 sides such that each of the supports 26 generally extends upwardly from a respective one of the front 22 and back 24 sides. The supports 26 each have an inner surface 28, an outer surface 30, a top end 32 and a bottom end 34. Each of the bottom ends 34 extends into the upper surface 14. Each of the inner surfaces 28 adjacent to the upper surface 14 is concavely arcuate and each of the top ends 32 is convexly arcuate. This forms a smooth transition from the inner surfaces 28 to the upper surface 14 and forms a cradle for an edge 7 of a hand 6. Each of the supports 26 has a slot 36 extending into the top ends 32 that extends toward the bottom ends 34 to defined two arms 38 of each of the supports 26. The arms 28 allow for better air-flow to keep the hand 6 cool.

Each of a pair of biasing members 40 is coupled to one of the supports 26 such that the upper ends 32 are biased toward each other. The biasing members 40 are preferably spring members wound about hinges that couple supports 26 to the base 12. The biasing members 40 retain the aid 10 on the hand.

A ball bearing 42 is rotatably mounted in the lower surface 16 such that the ball bearing 42 extends through a plane of the lower surface 16. The ball bearing 42 is preferably comprised of substantially rigid material that may include an elastomer, a plastic or a metal.

In use, the edge 7 of the hand 6 adjacent to the little finger may be positioned adjacent to the upper surface 14 such that each of the supports 26 is abutting opposite sides of the hand 6. The user then grips a writing utensil 8 in a conventional manner. The user writes in a conventional manner and the ball bearing 42 allows for smooth and even movement of the hand while the user is writing. The smooth movement aids in the penmanship of the user of the aid 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handwriting aid for selectively positioning on an edge of a hand positioned adjacent to a little finger, said aid comprising:

a base portion having an upper surface, a lower surface, a first lateral side, a second lateral side, a front side and a back side;

a pair of supports, each of said supports being hingedly coupled to said base portion, each of said supports being positioned adjacent to one of said front and back sides such that each of said supports generally extends upwardly from a respective one of said front and back sides;

a pair of biasing members, each of said biasing members being coupled to one of said supports such that said upper ends are biased toward each other;

a ball bearing being rotatably mounted in said lower surface such that said ball bearing extends through a plane of said lower surface; and wherein the edge of the hand may be positioned adjacent to said upper surface such that each of the supports is abutting opposite sides of the hand.

2. The handwriting aid according to claim 1, wherein said upper surface is concavely arcuate from said front side to said back side.

3. The handwriting aid according to claim 2, wherein each of said supports has an inner surface, an outer surface, a top end and a bottom end, each of said bottom ends extending into said upper surface.

4. The handwriting aid according to claim 3, wherein each of said inner surfaces adjacent to said upper surface being concavely arcuate.

5. The handwriting aid according to claim 4, wherein each of said top ends are convexly arcuate.

6. The handwriting aid according to claim 5, wherein each of said supports has a slot extending into said top ends and extending toward said bottom ends such that two arms of each of said supports is defined.

7. The handwriting aid according to claim 3, wherein each of said supports has a slot extending into said top ends and extending toward said bottom ends such that two arms of each of said supports is defined.

8. The handwriting aid according to claim 1, wherein each of said supports has an inner surface, an outer surface, a top end and a bottom end, each of said bottom ends extending into said upper surface.

9. The handwriting aid according to claim 1, wherein each of said top ends are convexly arcuate.

10. A handwriting aid for selectively positioning on an edge of a hand positioned adjacent to a little finger, said aid comprising:

a base portion having an upper surface, a lower surface, a first lateral side, a second lateral side, a front side and a back side, said upper surface being concavely arcuate from said front side to said back side;

a pair of supports, each of said supports being hingedly coupled to said base portion, each of said supports being positioned adjacent to one of said front and back sides such that each of said supports generally extends upwardly from a respective one of said front and back sides, each of said supports having an inner surface, an outer surface, a top end and a bottom end, each of said bottom ends extending into said upper surface, each of said inner surfaces adjacent to said upper surface being concavely arcuate, each of said top ends being convexly arcuate, each of said supports having a slot extending into said top ends and extending toward said bottom ends such that two arms of each of said supports is defined;

a pair of biasing members, each of said biasing members being coupled to one of said supports such that said upper ends are biased toward each other;

a ball bearing being rotatably mounted in said lower surface such that said ball bearing extends through a plane of said lower surface; and wherein the edge of the hand may be positioned adjacent to said upper surface such that each of the supports is abutting opposite sides of the hand.

* * * * *